Oct. 15, 1946.                B. E. SIVYER                2,409,318
                             CONVEYER FLIGHT
                          Filed Dec. 26, 1944
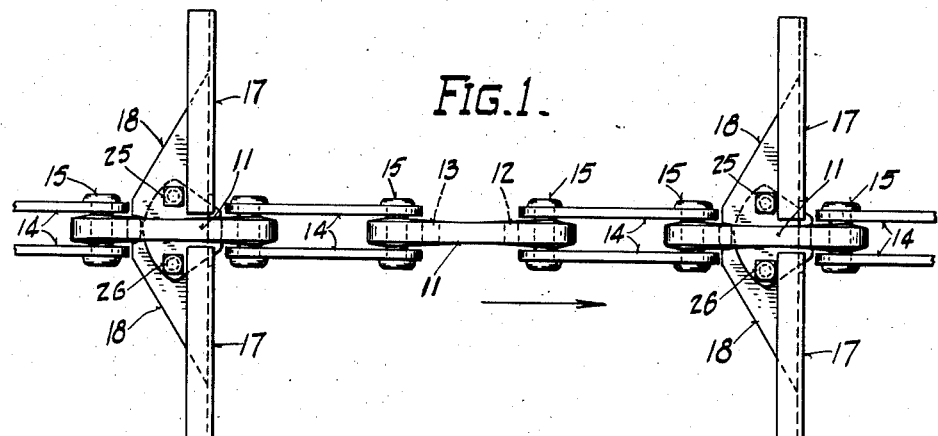
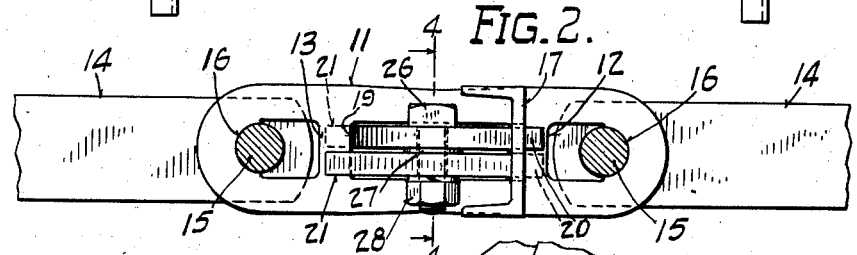
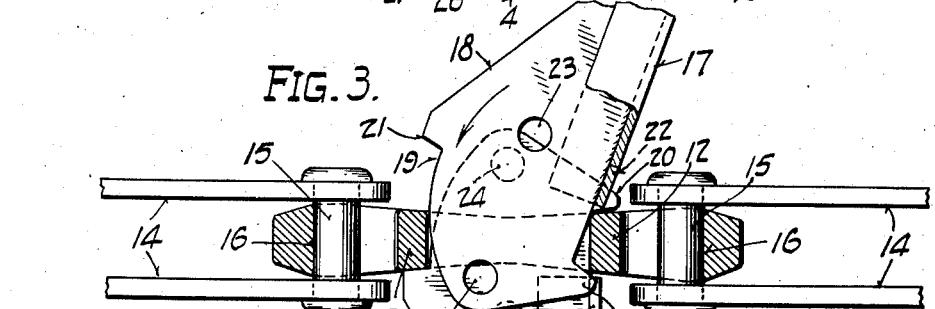
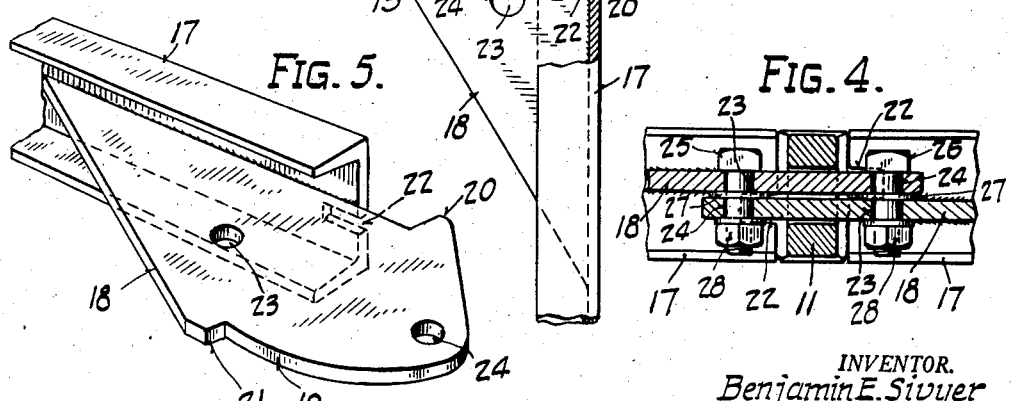
INVENTOR.
Benjamin E. Sivyer
BY
George A. Evans
ATTORNEY.

Patented Oct. 15, 1946

2,409,318

UNITED STATES PATENT OFFICE 2,409,318

CONVEYER FLIGHT

Benjamin E. Sivyer, Whitefish Bay, Wis., assignor to Chain Belt Company, Milwaukee, Wis., a corporation of Wisconsin Application December 26, 1944, Serial No. 569,822

7 Claims. (Cl. 198—176)

This invention relates to improvements in conveyers, particularly to the flights used therewith, which serve to move material directed into a trough or the like, the flights being attached to and propelled by transmission means such as an endless chain; and the objects of the invention are, first, to provide an improved flight which may be mounted on a link of a standard conveyer chain; second, to provide a flight construction such that flight parts may be interchangeable and when assembled with a chain link locked against movement with respect thereto; third, to provide a flight which will direct the forces exerted against the conveying portion of the flight to the chain link itself thus eliminating any shearing action on a holding instrumentality; fourth, to provide a flight one-half of which may be removed while the other half is capable of use with a simple attachment means; and, fifth, to provide a flight capable of easy manufacture.

These and other objects of the invention are accomplished by an arrangement of elements, one embodiment of which is shown in the accompanying drawing, wherein:

Figure 1 is a plan view of a conveyer chain with flights attached; Figure 2 is a side view of a conveyer link with flight members attached; Figure 3 is a plan view of a portion of a conveyer chain, parts being shown in section, with one section of the flight assembled and the other section being pivoted into place; Figure 4 is a section on line 4—4 of Figure 2; and Figure 5 is a perspective view of one section of the flight, the end of the channel bar being broken away.

In the drawing wherein similar numerals refer to similar parts throughout the views, the numeral 11 designates the flight link which may take various forms, but as illustrated herein consists of a unitary bar with an oblong slot extending substantially the full length thereof, with two spaced upright struts 12 and 13 forming eyelets for the rivets connecting the adjacent links. The adjacent links consist of side bars 14 which overlap the link 11 and are pivotally connected thereto by a rivet 15 which may be locked in the side bars against turning, the rivets finding a bearing seat in the curved portion 16 at the ends of eyelets adjacent the oblong slot. With this construction, the alternate block and side bar links may be connected to form an endless chain, which is trained over sprockets for propulsion, and the flights as hereinafter described attached to the links with the spacing desired. While the invention is not limited in its use to this particular chain, the chain shown is very well suited to the invention and hence its illustration in the drawing.

A cross member 17 serves as the conveying portion of one-half a flight. It is formed of a channel shaped member and can be of any size corresponding to the need of the conveyer system.

Extending perpendicularly from the rear side of the web of cross member 17 with its top surface near the center of the web is a projection or fin 18 forming the locking arm of the one-half flight. On this projection there is an angular recess 19 and a lug 20, the former being in the rear portion of the projection and the latter being formed by a forwardly curved extension of the projection.

The lug 20 and recess 19 are so arranged that the curved portion of the projection may be inserted through the space between the struts 12 and 13 of the attachment link and the lug 20 brought to bear against one side of the forward strut 12, while the abutment 21 adjacent the recess 19 bears against the opposite side of the rear strut 13. The flight is inserted through the opening in the link while at an acute angle thereto and then turned as indicated by the arrow in Figure 3 to its final transverse position.

A similar half flight is employed on the other side of the link with a projection overlapping that of the projection 18 described above. The half flights may be identical in which case one is turned end for end prior to insertion through the link, and since the fins 18 are on one side of the center of the flight face, they may overlap and the faces of the flight halves be in alignment on either side of the link.

The web of the cross member 17 is recessed as at 22 to permit the locking lug 20 to freely pass through and engage the side of the strut 12 as previously described. This also makes it possible to extend the material engaging face of the channel to a position closely adjacent the link.

The projections on the two half flights are apertured as at 23 and 24 so that when assembled, locking means, such as bolts 25 and 26 may pass through them to secure the assembled flights from sudden movements which might serve to disengage them. As illustrated herein, the projections 18 on the flight halves are spaced apart by a pair of washers 27 through which the bolts 25 and 26 pass and the bolts of course are retained by suitable nuts 28.

By making the separate cross flights of identical construction, interchangeability of flights is possible and the user of the conveyer need only stock one type, making for economy, ease of manufacture and simplicity in replacement.

Also it will be noted that the forces exerted against the face of the conveying member are transmitted to the sides of the chain link, where they are divided and brought into opposition with themselves and made to bear on the sides of the chain link, i. e., a couple being formed thus secures the flight while the conveyer is in operation. There is no shearing action on the holding instrumentalities 25 and 26 because the apertures through which they extend have sufficient clearance to prevent lateral contact between the sides of the aperture in the projections and the holding instrumentalities.

There may be instances where it is desirable not to employ a flight extending transversely on either side of the chain, but rather to use a flight extending from one side only. In order to facilitate the use of a one-half flight, a filler piece with apertures placed to cooperate with the apertures in the flight half should be inserted between the projecting element of the flight half and the remaining opening in the chain link. Such a filler piece may embody lugs for locking against the chain link, or may take other forms.

An advantage of the construction hereinabove described is that there is no shearing action on any pin, bolt or similar device, for the forces exerted by the material in the conveyer trough against the conveying portion of the flight are directed by a lever action to the sides of the conveyer chain; also the couple established by the opposition of the lug and recess holds the flight securely in place.

Another distinct advantage is that the flights can be attached to a standard chain without special devices or links. Thus, without disconnecting the chain links, cross flights can be very simply removed, new flights can be added, flight positions can be changed and old ones can be removed with a minimum of delay and effort.

The invention having been described what is claimed is:

1. A conveyer flight half having a material engaging face and a projection extending therefrom for insertion through a chain link, said projection having at least two opposite abutting surfaces disposed to engage opposite sides of the link when the projection is inserted in the link, whereby said opposite abutting surfaces may be positioned against the link, so that force exerted against the face of the flight half will retain the flight half on the link.

2. In combination a chain link having an aperture extending therethrough, a conveyer flight having a material engaging face extending from one side of the link, said flight having a projection extending through the aperture in the link, opposed means on the projection engaging opposite sides of the link whereby force exerted on the flight face acts through each of said means to cause the flight to be seated against the link and means holding the flight against movement from the link when force is relieved from the flight face.

3. A conveyer flight for use with a conveyer chain having an apertured link, said flight comprising flight halves each flight half having a material engaging face disposed on one side of said link and a projection extending from said material engaging face through the aperture in said link, the projections on said flight halves having instrumentalities for engaging opposite sides of the link to create a couple when force is applied on the flight faces, and means locking the flight halves against forces other than those exerted on the flight faces.

4. A conveyer flight as specified in claim 3 in which each of the material engaging faces comprises a channel shaped member having the end nearest the link notched to accommodate that portion of the projection on the other flight half which extends through the link and bears on the adjacent side of the link.

5. In a conveyer comprising a chain having an apertured chain link, flight halves each having a material engaging face and a projection arranged to extend through the aperture in the link, said projections overlapping, means securing the projections together and means formed on said projections for transmitting forces in opposed relationship directly from the flight faces to the link while relieving said securing means of all such forces.

6. A conveyer flight for use with an apertured chain link, having a projection extending therefrom, said projection having a hooked end with a notch-like angular recess terminating at one end in an abutment on the rearward side of said projection, and an abutment on the forward side of the projection, whereby when the hooked portion of the projection is inserted through the aperture in the chain link, the first named abutment may engage one side of the chain link, and the second named abutment may engage the opposite side of the link to seat the flight firmly against the link.

7. A conveyer flight for attachment to an apertured chain link, said flight having a material engaging face and a fin extending transversely from the rear of said face, one side of said fin being aligned substantially with the center of said face, and said fin having a hooked end portion with an abutment at the terminus of said hooked end portion and an opposed abutment placed at the start of said hooked end portion, said abutments being adapted to bear against opposite sides of said link for the purpose of establishing a couple with the link when the hooked end portion is inserted through the aperture in the link.

BENJAMIN E. SIVYER.